United States Patent [19]

Nomiya et al.

[11] 3,832,578

[45] Aug. 27, 1974

[54] STATIC FLIP-FLOP CIRCUIT

[75] Inventors: Kosei Nomiya; Kazuo Minorikawa; Shuichi Torii; Yoshikazu Hatsukano, all of Tokyo, Japan

[73] Assignee: Hitachi, Ltd., Tokyo, Japan

[22] Filed: June 13, 1973

[21] Appl. No.: 369,418

[30] Foreign Application Priority Data

June 28, 1972 Japan .............................. 47-64027

[52] U.S. Cl. .............. 307/279, 307/205, 307/221 C

[51] Int. Cl. ........................................... H03k 3/26

[58] Field of Search......... 307/205, 214, 221 C, 279

[56] References Cited

UNITED STATES PATENTS

| | | | |
|---|---|---|---|
| 3,483,400 | 12/1969 | Washizuka et al. | 307/279 |
| 3,555,307 | 1/1971 | Hujita | 307/279 |
| 3,573,498 | 4/1971 | Ahrons | 307/279 |

FOREIGN PATENTS OR APPLICATIONS

| | | | |
|---|---|---|---|
| 4,610,220 | 3/1971 | Japan | 307/221 C |

OTHER PUBLICATIONS

"Dynamic Mos–A Logical Choice" by Fette (Publication Unknown) Nov. 15, 1971. Copy attached. 9 pages.

*Primary Examiner*—Stanley D. Miller, Jr.
*Attorney, Agent, or Firm*—Craig & Antonelli

[57] ABSTRACT

A static flip-flop circuit comprising a first inverter including a first insulated gate field-effect transistor (MIS-FET), a second inverter including a second MIS-FET and whose output is feedback-connected to the gate of the first MIS-FET, a third inverter including a third MIS-FET, the gates of the second and third MIS-FET's being interconnected, a transfer gate MIS-FET whose gate is connected to receive a first train of clock pulses, an input MIS-FET whose gate is connected to receive an input signal, a control MIS-FET which is connected in series with the input MIS-FET, the series connection being incorporated in parallel with the first MIS-FET, a further control MIS-FET which is connected in parallel with the second MIS-FET, and a reading MIS-FET which is connected to the output of the third inverter and whose gate is connected to receive a second train of clock pulses differing in phase from the first train of clock pulses, the control MIS-FET's being connected to receive a writing control signal at their gates, the writing control signal being adapted to render the control MIS-FET's conductive when at least the transfer gate MIS-FET is conductive at writing, whereby the same information as stored in the second MIS-FET is stored in the third MIS-FET in order to be read out through the reading MIS-FET.

8 Claims, 6 Drawing Figures

STATIC FLIP-FLOP CIRCUIT

BACKGROUND OF THE INVENTION

1. Field of the Invention

The present invention relates to a flip-flop circuit, and more particularly to a static flip-flop circuit composed of insulated gate field-effect transistors.

2. Description of the Prior Art

Flip-flop circuits composed of insulated gate field-effect transistors (hereinafter simply termed transistors) are broadly classified as dynamic flip-flop circuits, and static flip-flop circuits. Since the dynamic flip-flop circuit is simple in construction, it is often employed in devices such as a shift register in which a number of flip-flop circuits are connected in cascade. In the case where the writing period of information for the flip-flop circuit is long, the static flip-flop circuit having a feedback path is more suitable.

Examples of static flip-flop circuits are shown in FIGS. 1 and 2.

The static flip-flop circuit in FIG. 1 is constructed of a first inverter circuit composed of transistors $Q_{21}$ and $Q_{22}$, a second inverter circuit composed of transistors $Q_{23}$ and $Q_{24}$, a third inverter circuit composed of transistors $Q_{25}$ and $Q_{26}$, and transistors $Q_{27}$–$Q_{29}$ which serve as transfer gates. The second inverter circuit and the third inverter circuit are connected in cascade. The output terminal of the third inverter circuit is feedback-connected through the transfer gate transistor $Q_{29}$ to the input terminal of the second inverter circuit. An information is statically retained by the feedback loop. The contents of the information to be retained by the feedback loop are determined by an input signal $V_{in}$, when the transfer gate transistor $Q_{27}$ is turned on by a writing control clock pulse $\phi_{1x}$.

The gate electrodes of the transistor $Q_{28}$ and $Q_{29}$ receive clock pulses $\phi_2$ shown in FIG. 3(*b*), while the gate electrode of the transistor $Q_{27}$ receives writing control clock pulses $\phi_{1x}$ differing in phase from the pulses $\phi_2$.

The respective drain electrodes of the load transistors $Q_{21}$, $Q_{23}$ and $Q_{25}$ are connected to a negative DC voltage $V_{dd}$, and the respective gate electrodes are connected to a negative DC voltage $V_{gg}$ which is larger than the voltage $V_{dd}$ by the threshold voltage $V_{th}$ of the transistors ($V_{gg} \geqq V_{dd} + V_{th}$).

On account of the well-known substrate effect, a voltage to be applied to the gate electrodes of the transfer gate transistors $Q_{27}$–$Q_{29}$ requires a high level as in the load transistors $Q_{21}$, $Q_{23}$ and $Q_{25}$, for example, the same level as that of the voltage $V_{gg}$. The substrate effect arises for the reason that, in the case where the substrates of the respective transistors are commonly connected to a reference potential point (for example, in an integrated semiconductor circuit, the respective transistors have a single common semiconductor substrate), a voltage is impressed between the source electrode of each transistor and the substrate. The clock pulses $\phi_1$ and $\phi_2$ are therefore generated at high voltage levels outside the integrated semiconductor circuit device.

On the other hand, the writing control clock pulse $\phi_{1x}$ is generated by taking, as shown in FIG. 3(*a*), the logic between the clock pulse $\phi_1$ and a control signal X generated in, for example, an electronic computer. The logic is established by a logic circuit consisting of transistors $Q_{31}$–$Q_{35}$, the logic circuit being similarly made within the integrated semiconductor circuit in which the flipflop circuit is constructed. Herein, the output potential of the logic circuit falls to an electric potential approximately equal to the voltage $V_{dd}$. In general, accordingly, in order to raise the output potential, level conversion is performed by a circuit outside the integrated semiconductor circuit device so as to bring the output pulse into a clock control pulse of high level. It is also submitted that, with an identical integrated semiconductor circuit device, the output level of the logic circuit is raised by additionally providing one power source. Anyway, however, it is inevitable to increase the number of external terminals of the integrated circuit device, and therefore, the configuration of the integrated circuit device is subject to undesirable restrictions.

When, in the static flip-flop circuit in FIG. 1, the load transistors $Q_{21}$, $Q_{23}$ and $Q_{25}$ are intended for the clock drive in order to reduce power consumption, charge sharing as will be hereunder explained also becomes a problem.

When, by way of example, the clock control pulse $\phi_{1x}$ is applied to the gate electrode of the transistor $Q_{27}$ and the clock pulse $\phi_2$ to the gate electrodes of the transistors $Q_{28}$ and $Q_{29}$, the following problem is raised.

The contents of an information retained in the feedback loop made up of the transistors $Q_{24}$–$Q_{26}$ and $Q_{29}$ are represented by the drain voltage of the transistor $Q_{26}$, which is 0 volt. In this case, the transistor $Q_{27}$ is subsequently turned on by the clock pulse $\phi_{1x}$, and the voltage $V_{dd}$, for example, is written into the gate capacity of the transistor $Q_{24}$. Then, when the transistor $Q_{29}$ is turned on, charge sharing takes place. More specifically, the gate voltage of the transistor $Q_{24}$ is $V_{dd}$ at first; however, upon conduction of the transistor $Q_{29}$, it is divided by the interconnection capacity $C_1$ between the transistors $Q_{24}$ and $Q_{29}$, including the gate capacity of the transistor $Q_{24}$ and the interconnection capacity $C_2$ between the transistors $Q_{26}$ and $Q_{29}$, and lowers to $C_1 \cdot V_{dd}/(C_1+C_2)$.

Accordingly, as the capacity $C_2$ becomes larger than the capacity $C_1$ by greater difference, the gate potential of the transistor $Q_{24}$ decreases further. This could become the cause of erroneous operation.

On the other hand, with the static flip-flop circuit in FIG. 2, since the source electrodes of transisotrs $Q_7$ and $Q_8$ for control of writing are grounded, the foresaid substrate effect does not occur, and the voltage level of the wiring control pulse $\phi_{1x}$ may be low. Since the output terminal of an inverter circuit composed of transistors $Q_2$ and $Q_4$ is directly feedback-connected to the input terminal of an inverter circuit composed of transistors $Q_1$ and $Q_5$ without the intervention of the transistor for the transfer gate $Q_{29}$ as in FIG. 1, the aforesaid charge sharing effect is not induced, and the load transistors $Q_1$ and $Q_2$ can be clock-driven. As will now be explained, however, another problem arises.

The clock control pulse $\phi_{1x}$ is formed by the logic circuit consisting of the transistors $Q_{31}$–$Q_{35}$, which receives the clock pulse $\phi_1$ and the control signal X as its input signals, as shown in FIG. 3(*a*). In consequence, the clock control pulse $\phi_{1x}$ lags over the clock pulse $\phi_1$, as shown in FIG. 3(*b*). Accordingly, the period of time during which the clock pulse $\phi_1$ and the clock control pulse $\phi_{1x}$ overlap, in other words, the period of time during which transistors $Q_3$ and $Q_7$ and transistors $Q_3$ and $Q_8$ are simultaneously held conductive during writing, is made shorter than the pulse width of the clock pulse $\phi_1$ by the delay time of the logic circuit, as illustrated by the hatched portion of FIG. 3(*b*). The fact that the time interval of the concurrent conduction of the transistors is short, leads to the fact that the period of time for writing the input signal $V_{in}$ into the flip-flop circuit is short. This will possibly cause erroneous operation. For example, if the time interval of the simultaneous conduction of the transistors $Q_7$ and $Q_3$ is short, there will be the possibility of an erroneous operaton due to the relationship of the discharge time constant of a circuit made up of the transistors $Q_3$, $Q_4$, $Q_6$ and $Q_7$, a voltage retained in the gate capacity of the transistor $Q_4$ and the threshold voltage $V_{th}$ of the transistor $Q_4$. If the simultaneous conduction time of the transistors $Q_8$ and $Q_3$ is short, there will be the possibility of an erroneous operation due to the relationship of the charge time constant of a circuit consisting of the transistors $Q_1$, $Q_3$ and $Q_4$, a supply voltage $V_{dd}$ and the threshold voltage $V_{th}$ of the transistor $Q_4$. Especially, the latter case during charging becomes a serious problem. In order to prolong the overlapping period of time between the clock pulse $\phi_1$ and the clock control pulse $\phi_{1x}$, the pulse width of the clock pulse $\phi_1$ may be made sufficiently long. To this end, however, it is required to lower the clock frequency, which makes it inevitable to lower the speed of the shift register or the like.

SUMMARY OF THE INVENTION

It is accordingly, the principal object of the present invention to provide a flip-flop circuit which can utilize a writing control signal of low level and by which the period of time during which the writing control signal and a clock pulse overlap can be made equal to the period of time with the pulse width of the clock pulse exploited by 100 percent.

The other objects of the present invention will be apparent from the following detailed description when read in conjunction with the accompanying drawings.

BRIEF DESCRIPTION OF THE DRAWINGS

FIG. 3(*b*) is a waveform diagram of the clock pulses ($\phi_1$) and ($\phi_2$), the control signal X and the clock control pulse ($\phi_{1x}$) in the circuits in FIGS. 1 and 2;

DESCRIPTION OF THE PREFERRED EMBODIMENT

Figure 4:
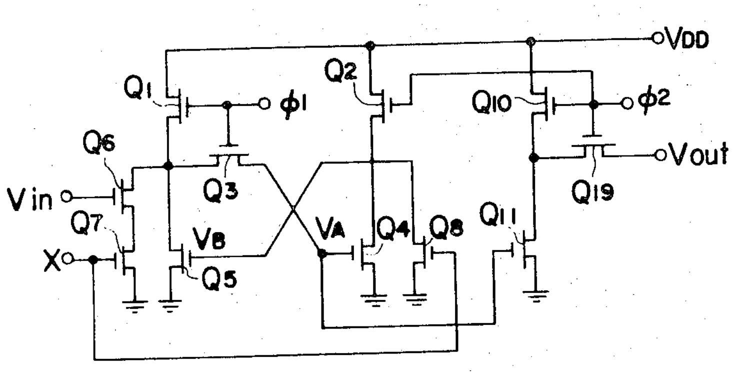
FIG. 4 is a schematic circuit diagram of one embodiment of a static flip-flop circuit according to the present invention.

FIG. 4 shows an embodiment of the static flip-flop circuit according to the present invention. A transistor $Q_1$ as a load resistance has a transistor $Q_5$ for storage connected in series therewith, to constitute the first inverter circuit. A transistor $Q_2$ as a load resistance has a transistor $Q_4$ for storage connected in series therewith to constitute the second inverter circuit. An output signal of the first inverter circuit is introduced to the gate of the transistor $Q_4$ through a transistor $Q_3$ serving as a transfer gate. In parallel with the transistor $Q_5$ there is provided a series circuit consisting of a transistor $Q_6$ for receiving an input and a transistor $Q_7$ for clock control. A transistor $Q_{10}$ as a load resistance has a transistor for storage $Q_{11}$ connected in series therewith, to form a third inverter circuit. A transistor $Q_{19}$ for reading is connected to the output end of the third inverter circuit. The gate of the transistor $Q_{11}$ is connected to the gate of the transistor $Q_4$. The respective gates of the transistors $Q_2$, $Q_{10}$ and $Q_{19}$ are connected to receive clock pulses $\phi_2$ which differ in phase from clock pulses $\phi_1$ and with which an input $V_{in}$ applied to the gate of the transistor $Q_6$ is synchronized. The respective gates of the transistors $Q_7$ and $Q_8$ are connected to receive a writing control signal X which has a sufficient overlap with the clock pulses $\phi_1$.

A DC potential source $V_{dd}$ is connected to the drains of the transistors $Q_1$, $Q_2$ and $Q_{10}$, and imparts an appropriate bias potential thereto. All the transistors are of the P-channel type.

Figure 5:
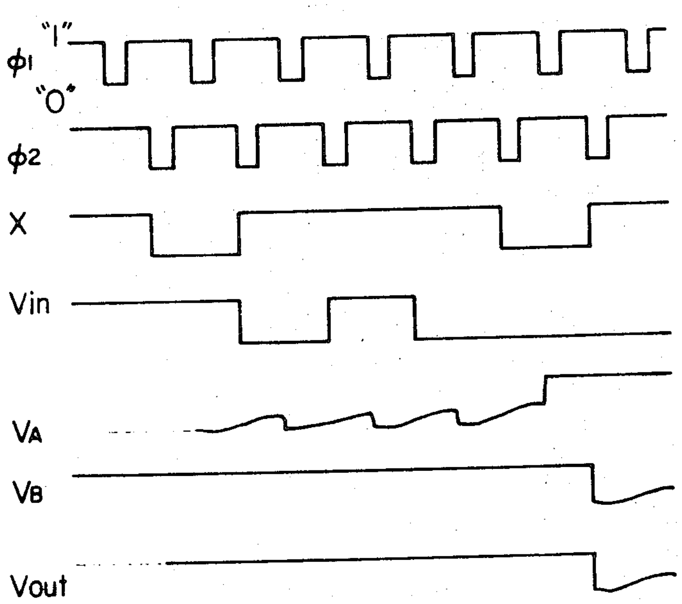
FIG. 5 is a waveform diagram illustrating certain operations of various parts in the circuit shown in FIG. 4.

Referring now to FIG. 5, the operation of the circuit in FIG. 4 will be explained. In each of various waveforms in FIG. 5, the upper level is level "1" (ground potential), while the lower level is level "0" (negative potential).

It is assumed that the clock pulses $\phi_1$ and $\phi_2$, the clock control pulses X and the input $V_{in}$ are respectively in a timing relation shown in FIG. 5. Then, the operation proceeds as follows:

1. When the writing control signal X becomes 0, the transistors $Q_7$ and $Q_8$ are turned on, and thereby, the storage transistor $Q_5$ is forcibly turned off. Therefore, a new information $V_{in}$ is written into the storage transistors $Q_4$ and $Q_{11}$ through the transistors $Q_6$ and $Q_3$ preferentially during the 0 period of the clock pulses $\phi_1$ irrespective of the previous information.

2. Subsequently, when the clock pulse $\phi_2$ becomes 0, the stored information is read out through the transistors $Q_{11}$ and $Q_{19}$, and an output $V_{out}$ is provided from the output end.

3. When the writing control pulse X falls into the state 1, the transistors $Q_7$ and $Q_8$ are turned off. Therefore, the previous information is written again in the transistors $Q_4$ and $Q_{11}$ through the transistors $Q_5$ and $Q_3$ during the 0 period of the clock pulse $\phi_1$ irrespective of the new information. The contents are similarly read out through the transistor $Q_{19}$ in the 0 period of the clock pulse $\phi_2$.

As a result, the gate potentials $V_B$ and $V_A$ of the transistors $Q_5$ and $Q_4$ ($Q_{11}$) and the output $V_{out}$ become as illustrated in FIG. 5.

As described above, in accordance with the present invention, the pulse width of the clock pulse $\phi_1$ can be utilized by 100 percent. It is therefore possible to make the pulse width narrow and to raise the clock frequency.

Figure 1:
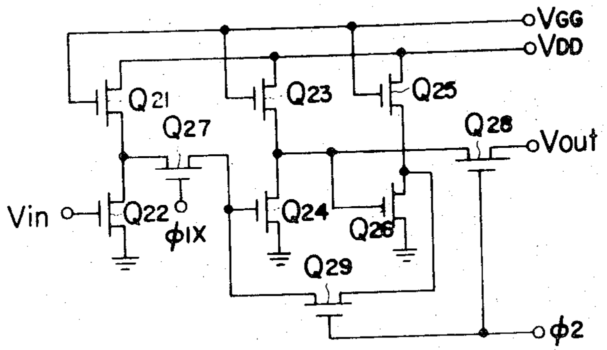
FIGS. 1 and 2 are schematic circuit diagrams of the prior art static flip-flop circuits referred to above.
Figure 2:
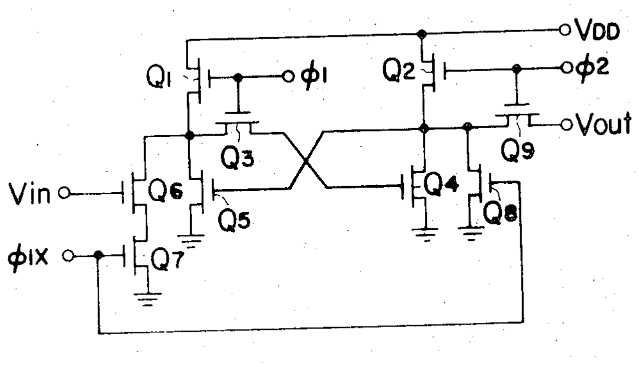
Figure 3A:
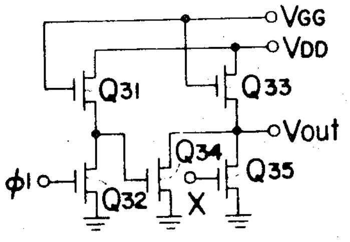
FIG. 3(*a*) is a schematic circuit diagram of the logic circuit as previously stated, for producing the clock control pulse $\phi_{1x}$ of the control signal X and the clock pulse $\phi_1$.
Figure 3B:
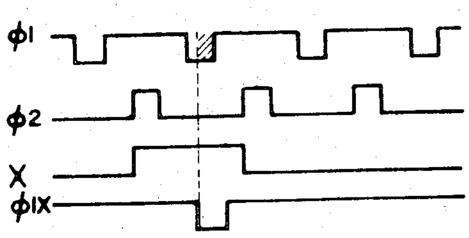

More specifically, when the control pulse X as in FIG. 5 is used as the clock control pulse in the circuit in FIG. 2, the following erroneous operation arises. In the case where the writing control signal X is 0, the transistor $Q_8$ is always rendered conductive during reading (when the clock pulse $\phi_2$ becomes 0), and the signal 1 is always fed to the output $V_{out}$ independently of the new information. That is, on account of the disconnection of the feedback loop, in the case of writing the new information, the transistor $Q_8$ is rendered conductive to thereby bring the gate voltage of the transistor $Q_5$ to 0 volt. It is therefore impossible to derive an output signal from the drain electrode of the transistor $Q_5$, namely, the gate electrode of the transistor $Q_4$.

In contrast, with the circuit in FIG. 4, an output signal is derived from the gate electrode of the transistor $Q_4$. The information stored in the transistors $Q_4$ and $Q_{11}$ accordingly are not influenced by the writing control pulse X, so that the object of the present invention is accomplished. The writing control signal X need be such that at least the clock pulse $\phi_1$ becomes 0 during writing.

It is a matter of course that the present invention can be performed in various modified forms without departing from the subject matter thereof. In particular, modified aspects as mentioned below can be readily put into practice as may be needed.

1. Instead of the clock pulses $\phi_1$ and $\phi_2$, a fixed DC potential may be applied to the respective gates of the load transistors $Q_1$, $Q_2$ and $Q_{10}$.

2. It is possible to impress the control pulse X on the transistor $Q_6$ and the input $V_{in}$ on the transistor $Q_7$.

3. In lieu of the load transistors $Q_1$, $Q_2$ and $Q_{10}$, other resistance means may be employed.

4. A set preference flip-flop circuit (RSSFF circuit) can be constructed in such a way that another transistor is connected in series with the transistor $Q_8$, and that a reset signal R is applied to the gate of the other transistor, while a set signal S is applied to the transistor $Q_6$.

What is claimed is:

1. A static flip-flop circuit which comprises a first inverter circuit including first load resistance means and a first insulated gate field-effect transistor for storage connected in series with said first load resistance means, a second inverter circuit including second load resistance means and a second insulated gate field-effect transistor for storage connected in series with said second load resistance means, a third inverter circuit including third load resistance means and a third insulated gate field-effect transistor for storage connected in series with said third load resistance means, a fourth insulated gate field-effect transistor connected between the output of said first inverter circuit and the gate electrode of said second insulated gate field effect transistor, a series circuit consisting of a fifth insulated gate field-effect transistor and a sixth insulated gate field-effect transistor, a seventh insulated gate field-effect transistor connected in parallel with said second insulated gate field-effect transistor, and an eighth insulated gate field-effect transistor connected to the output of said third inverter circuit, and in which said series circuit is connected in parallel with said first insulated gate fieldeffect transistor, the output of said second inverter circuit is feedback-connected to a gate electrode of said first insulated gate field-effect transistor, first means for applying to the respective gate electrodes of said fourth and eighth insulated gate fieldeffect transistors first and second clock pulses which differ in phase from each other, second means for applying to the gate electrodes of said sixth and seventh insulated gate field-effect transistors a writing control signal which renders said sixth and seventh insulated gate field-effect transistors conductive when at least said fourth insulated gate field-effect transistor is conductive, third means for applying an input signal to the gate electrode of said fifth insulated gate field-effect transistor, said gate electrode of said second insulated gate field-effect transistor and the gate electrode of said third insulated gate field-effect transistor being interconnected, whereby the same information as that accumulated in said second insulated gate field-effect transistor is accumulated in said third gate field-effect transistor, and the former accumulated information is read out through said eighth insulated gate field-effect transistor.

2. A static flip-flop circuit as defined in claim 1, wherein said first, second, and third load resistance means are each comprised of further insulated gate field-effect transistors.

3. A static flip-flop circuit as defined in claim 2, wherein the insulated gate field-effect transistor forming said first load resistance means has its gate electrode connected to said first means to receive said first clock pulses.

4. A static flip-flop circuit as defined in claim 3, wherein the insulated gate field-effect transistors forming said second and third load resistance means have their gate electrodes connected to said first means to receive said second clock pulses.

5. A static flip-flop circuit as defined in claim 2, wherein the insulated gate field-effect transistors forming said first, second and third load resistance means have their gate electrodes connected to a fixed DC potential.

6. In a static flip-flop circuit including a source of bias potential, first load resistance means, a first insulated gate fieldeffect transistor connected in series with said first load resistance means to said source of bias potential, second load resistance means, a second insulated gate field-effect transistor connected in series with said second load resistance means to said source of bias potential, a third insulated gate field-effect transistor connected between the output of said first insulated gate field-effect transistor and the gate electrode of said second insulated gate field-effect transistor, fourth and fifth insulated gate field-effect transistors connected in series across said first insulated gate field-effect transistor, a sixth insulated gate field-effect transistor connected across said second insulated gate field-effect transistor, and a seventh insulated gate field effect transistor connected to an output terminal of the circuit, the output of said second insulated gate field-effect transistor being connected to the gate electrode of said first insulated gate field-effect transistor and the gate electrodes of said fifth and sixth insulated gate field-effect transistors being connected together, the improvement comprising third load resistance means, and an eighth insulated gate field-effect transistor connected in series with said third load resistance means to said source of bias potential, the gate electrodes of said second and eighth insulated gate fieldeffect transistors being connected together, said seventh insulated gate field-effect transistor being connected between said eighth insulated gate field-effect transistor and said output terminal.

7. A static flip-flop circuit as defined in claim 6, wherein said first, second, and third load resistance means are each comprised of further insulated gate field-effect transistors.

8. A static flip-flop circuit as defined in claim 6, wherein the insulated gate field-effect transistors forming said first, second and third load resistance means have their gate electrodes connected to a fixed DC potential.

* * * * *